Feb. 14, 1933. J. E. W. GREVE 1,897,932
ADDING AND CALCULATING MACHINE
Filed Sept. 25, 1928 14 Sheets-Sheet 1

Inventor:
J. E. W. Greve
By: Marks & Clerk
Attys.

Feb. 14, 1933.   J. E. W. GREVE   1,897,932
ADDING AND CALCULATING MACHINE
Filed Sept. 25, 1928   14 Sheets-Sheet 2
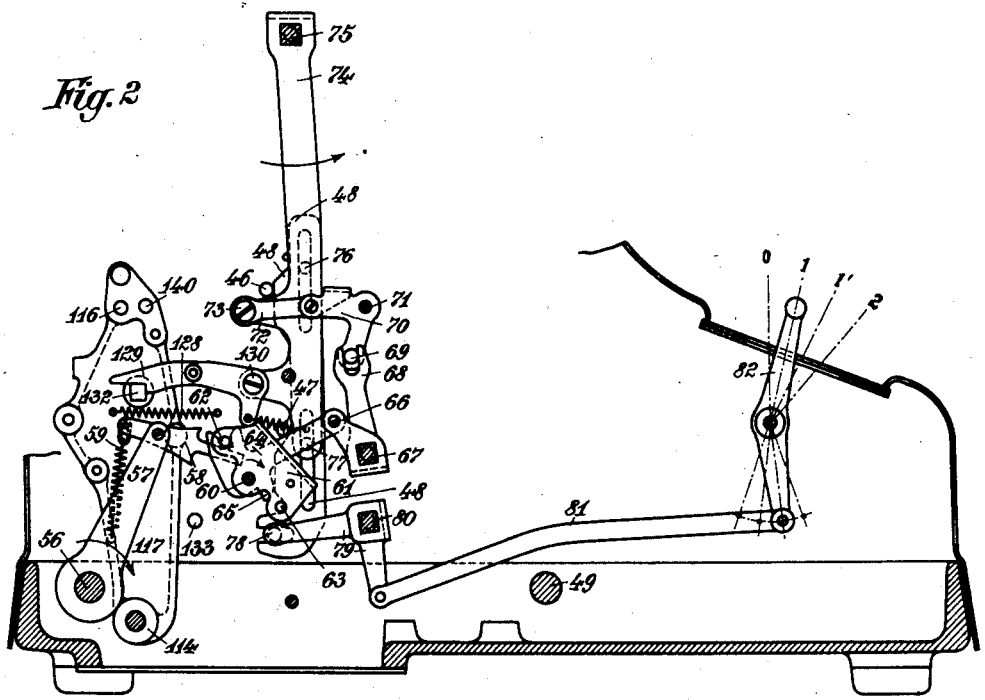
Inventor:
J. E. W. Greve
By: Marks & Clerk
Attys.

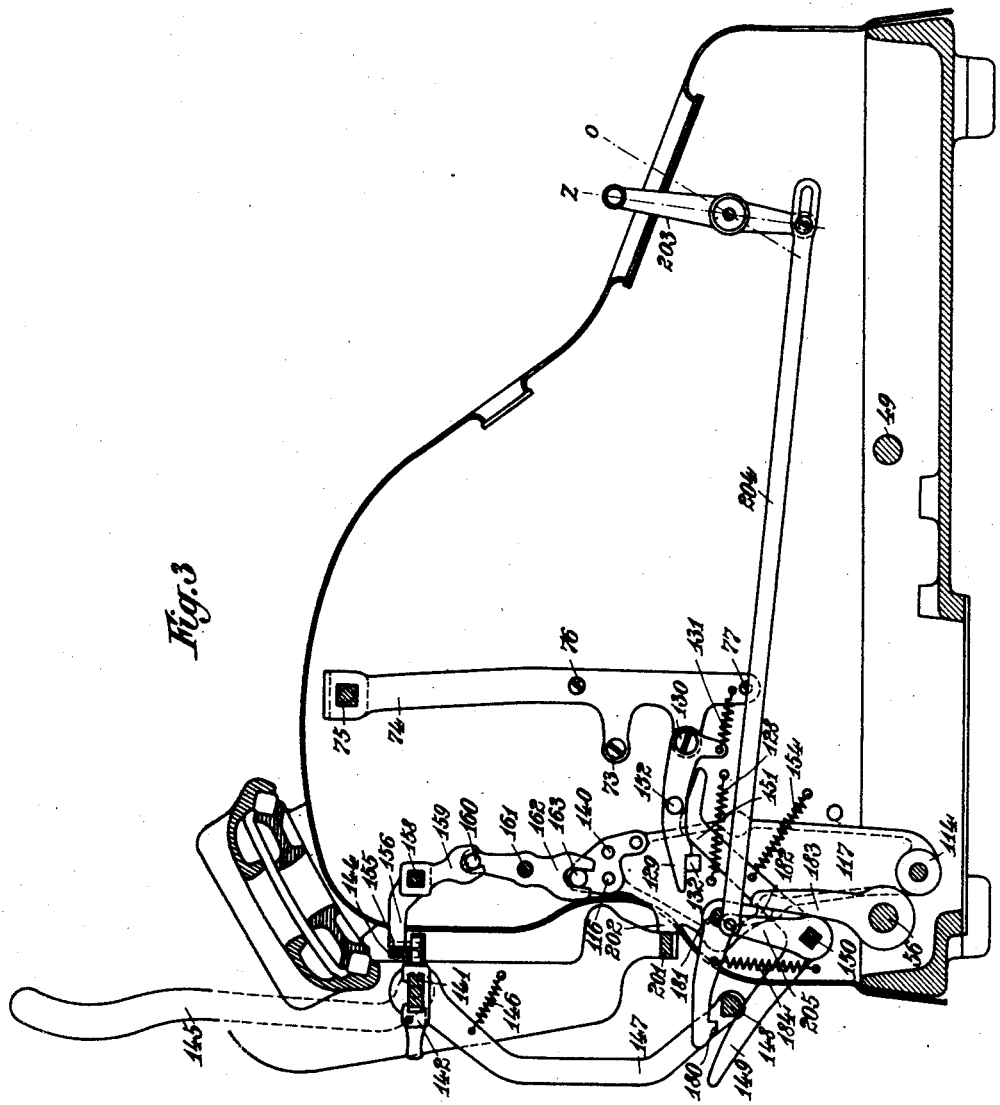

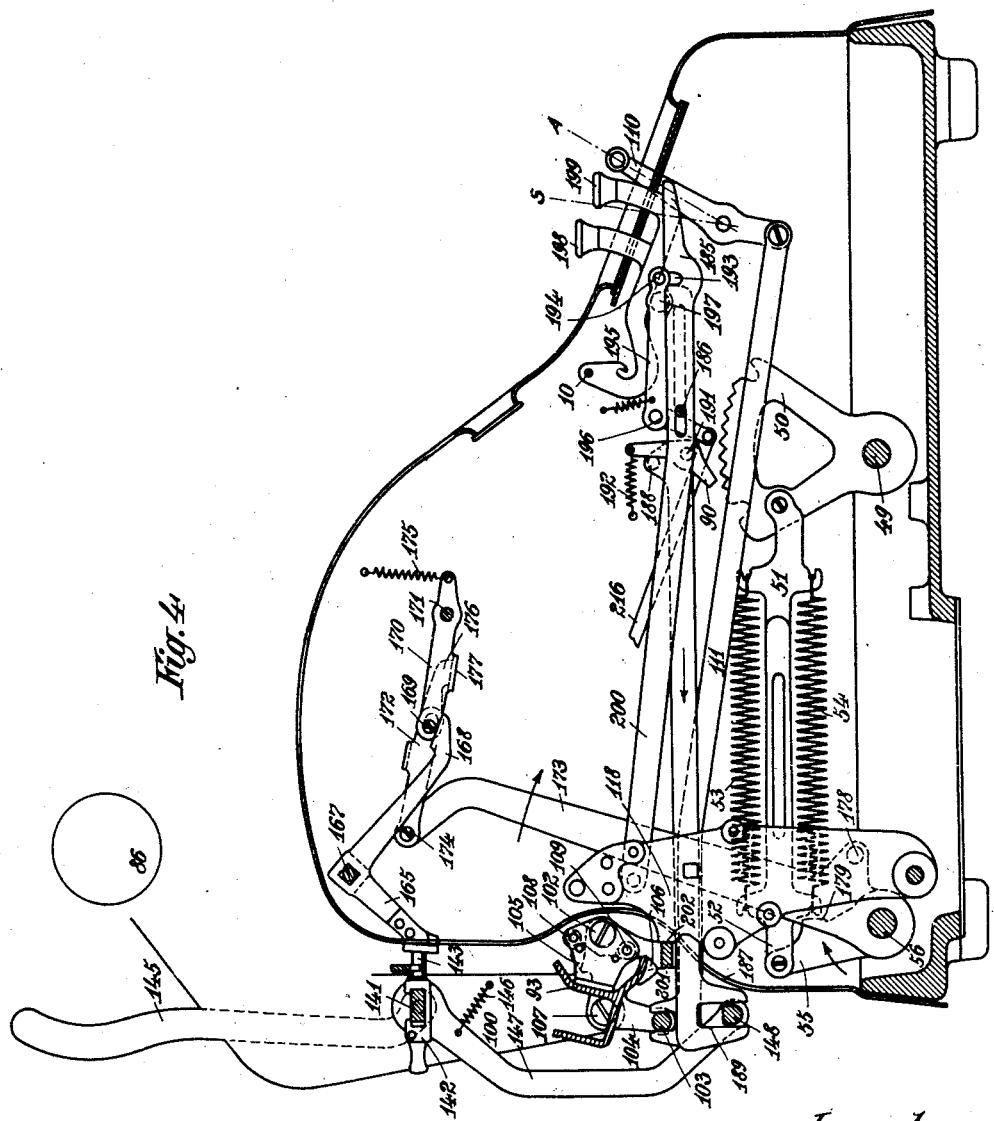

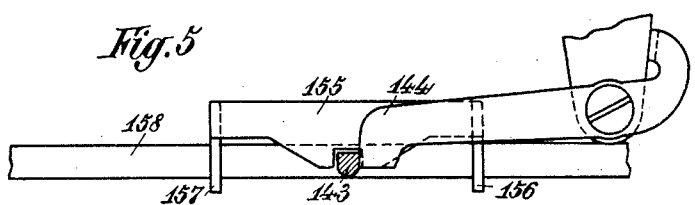
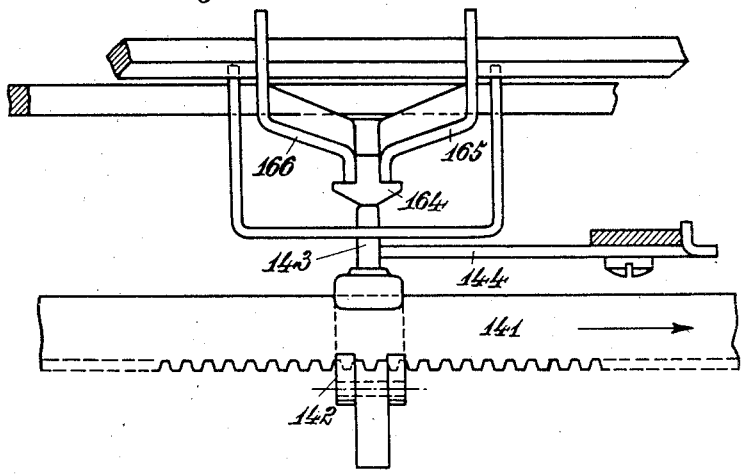
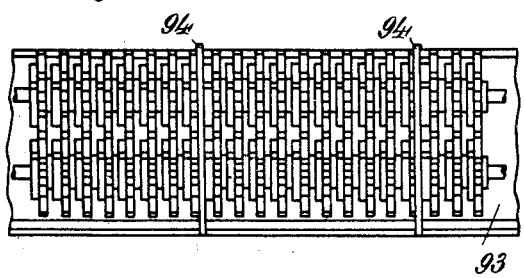
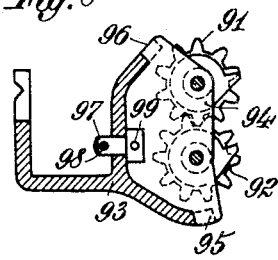

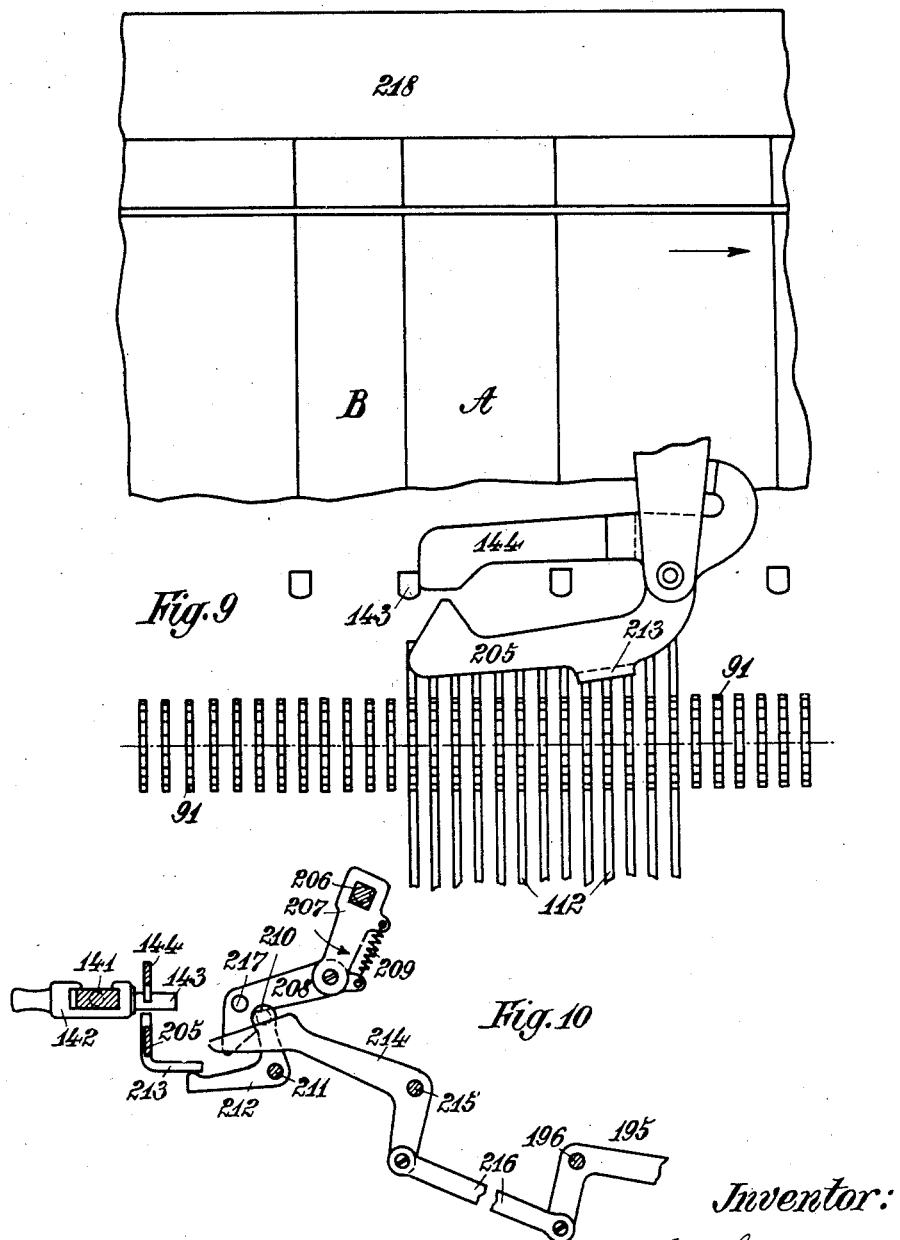

Feb. 14, 1933.  J. E. W. GREVE  1,897,932
ADDING AND CALCULATING MACHINE
Filed Sept. 25, 1928  14 Sheets-Sheet 7
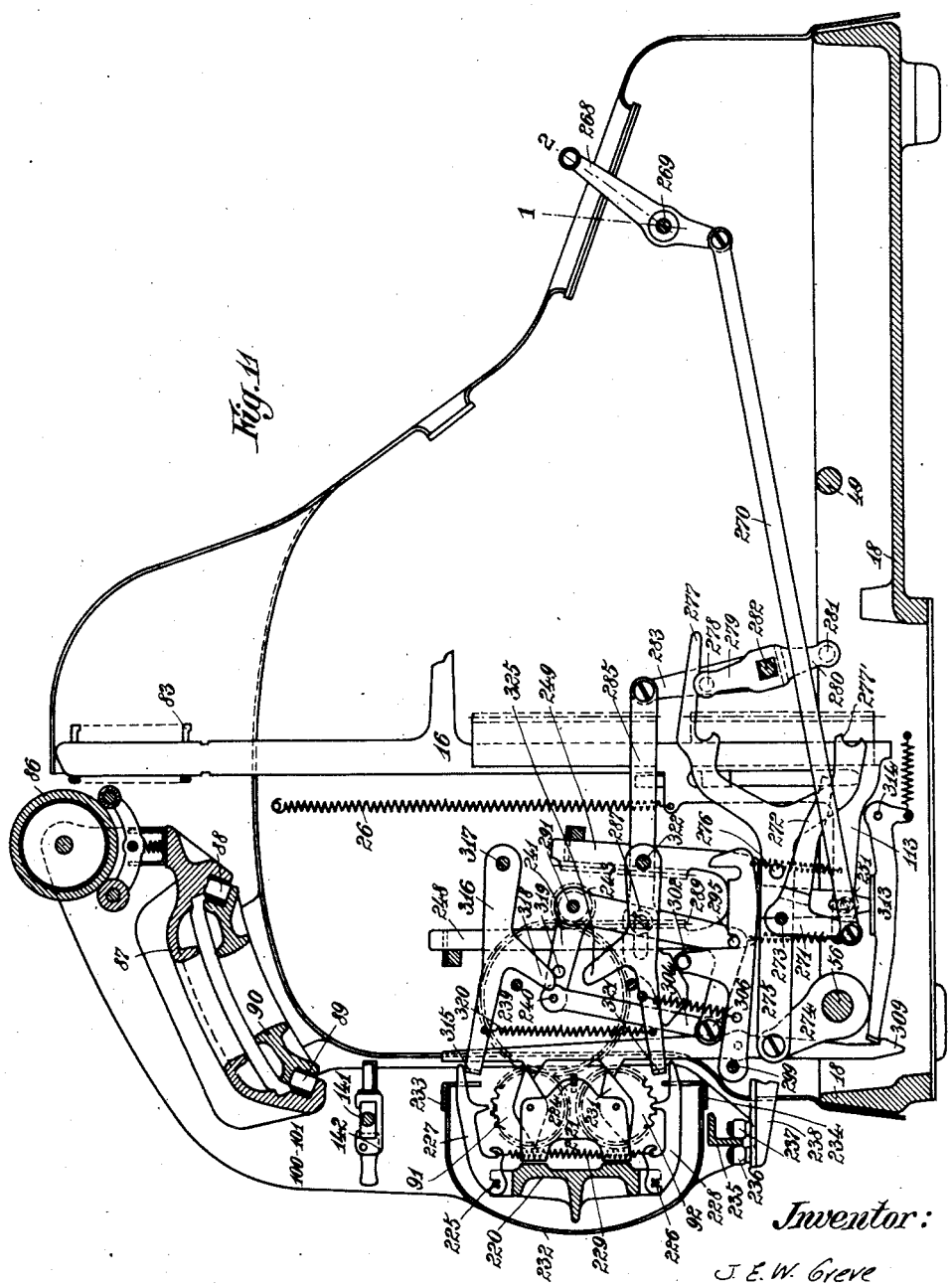
Inventor:
J. E. W. Greve Feb. 14, 1933.  J. E. W. GREVE  1,897,932
ADDING AND CALCULATING MACHINE
Filed Sept. 25, 1928   14 Sheets-Sheet 10

Inventor:
J. E. W. Greve

By: Marks & Clerk
Attys.

Fig. 16

Feb. 14, 1933.  J. E. W. GREVE  1,897,932
ADDING AND CALCULATING MACHINE
Filed Sept. 25, 1928  14 Sheets-Sheet 13

Inventor:
J. E. W. Greve

By: Marks & Clerk
Attys.

Feb. 14, 1933.　　　　J. E. W. GREVE　　　　1,897,932
ADDING AND CALCULATING MACHINE
Filed Sept. 25, 1928　　14 Sheets-Sheet 14
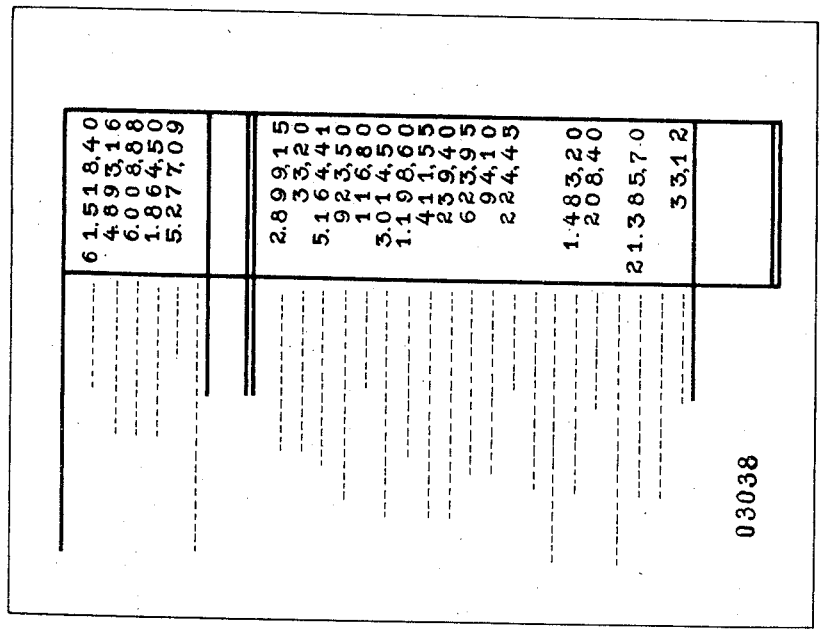
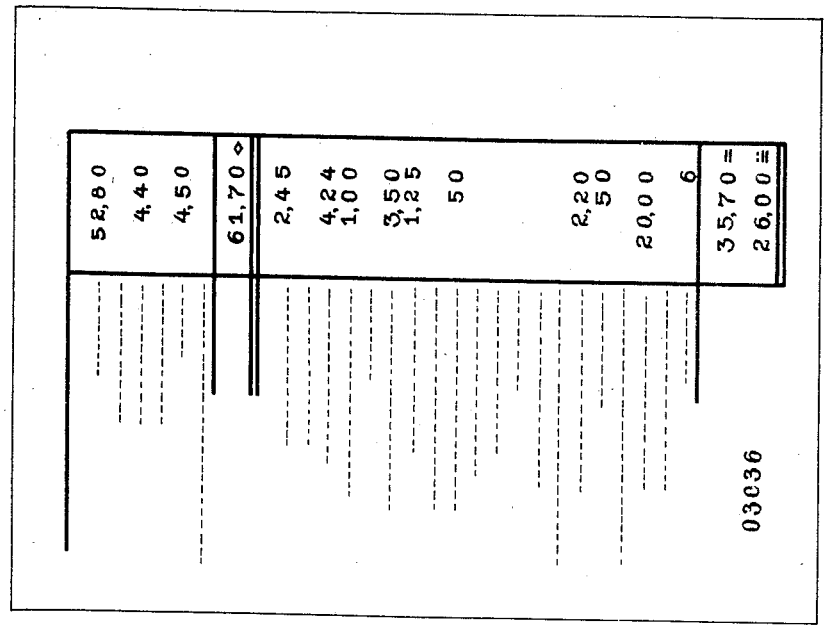
Inventor:
J. E. W. Greve
By Marks & Clerk
Attys.

Patented Feb. 14, 1933

1,897,932

UNITED STATES PATENT OFFICE

JOHN EMIL WILLIAM GREVE, OF CHEMNITZ, GERMANY, ASSIGNOR TO THE FIRM ASTRAWERKE AKTIENGESELLSCHAFT, OF CHEMNITZ, GERMANY

ADDING AND CALCULATING MACHINE

Application filed September 25, 1928, Serial No. 308,175, and in Germany April 24, 1928.

Adding and calculating machines with an automatic printing mechanism are frequently used for the purpose of making statements and accounts in columns on sheets, the single figures being written in horizontal rows next to one another. In such work, the amounts and figures of the same kind are always set in the same column so that vertical columns are thereby formed and as many column counting mechanisms are mounted on the paper carriage or on a separate carriage controlled by the paper carriage as there are vertical columns in order to be able to obtain at once the single column totals during the process of calculation. In a known machine of this type, the counting mechanisms are spaced apart and it is therefore difficult to accommodate as many counting mechanisms as are required for calculating the wages of large factories, mines etc. or for statistical work. In another machine, the column counting mechanisms are not spaced apart but they form—as is also known—a continuous row which is not divided by spaces. However, the counting wheels are not divided into any desired plurality of column counting mechanisms of varying width or capacity.

The object of the present invention is to obviate these drawbacks and to create a machine with an automatic total printing mechanism wherein the sheets and forms inserted can be completely filled up and the sums of all columns transversely and vertically as well as the total sum of these sums are obtained at once during the operation whether the work be done in a few wide or many narrow columns.

The new machine comprises in the constructional form as shown one or more principal or total counting mechanisms and a set of driving members which cooperates with a larger set of counting wheels mounted on the paper carriage. The set of counting wheels contains as many single digits as can be printed next to one another on the largest sheet which the machine can take. The driving members may be rendered operative and inoperative either manually or automatically during the operation of the machine by shifting the set of counting wheels, the lateral movement of which is in correlation to the shifting of the form to be written on. The row of counting wheels may be divided by the tabulator into any desired plurality of groups of any desired number of digits. Moreover, safety and locking means are provided in connection with the tabulator for preventing an improper working of the machine.

The accompanying drawings show by way of example three constructions of the machine according to the invention. In these drawings:

Figure 2 is a partial view of the control device for the accumulators.

Figures 3 to 6 show safety and locking devices and

Figures 7 to 10 details.

Figures 11 to 16 show a second construction, namely

Figure 12:
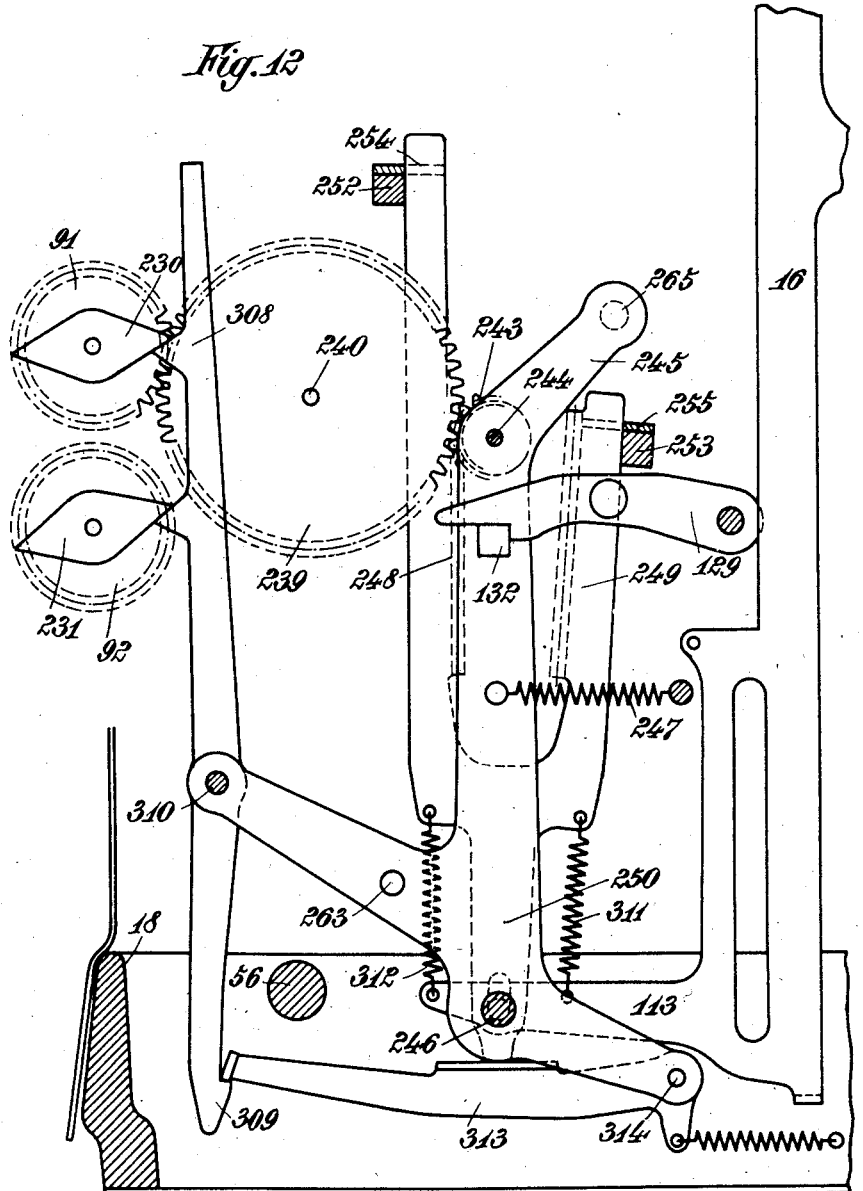
Figure 13:
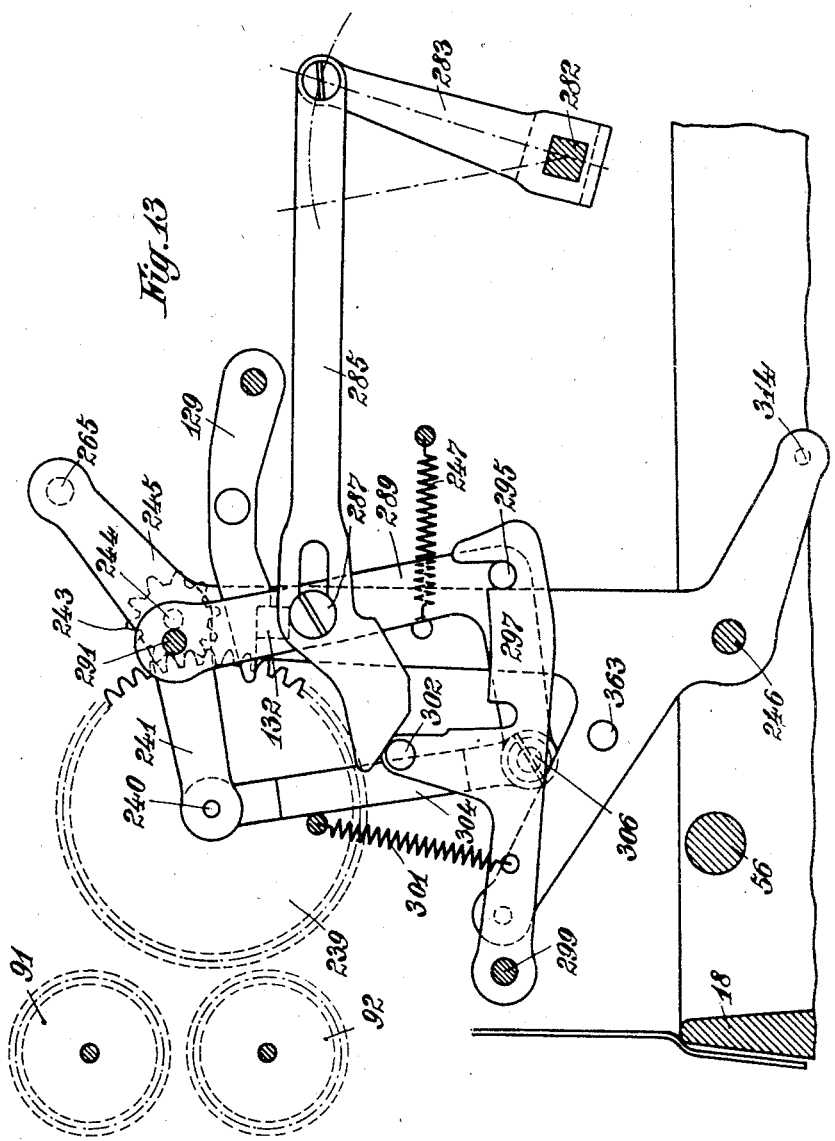
Figure 14:
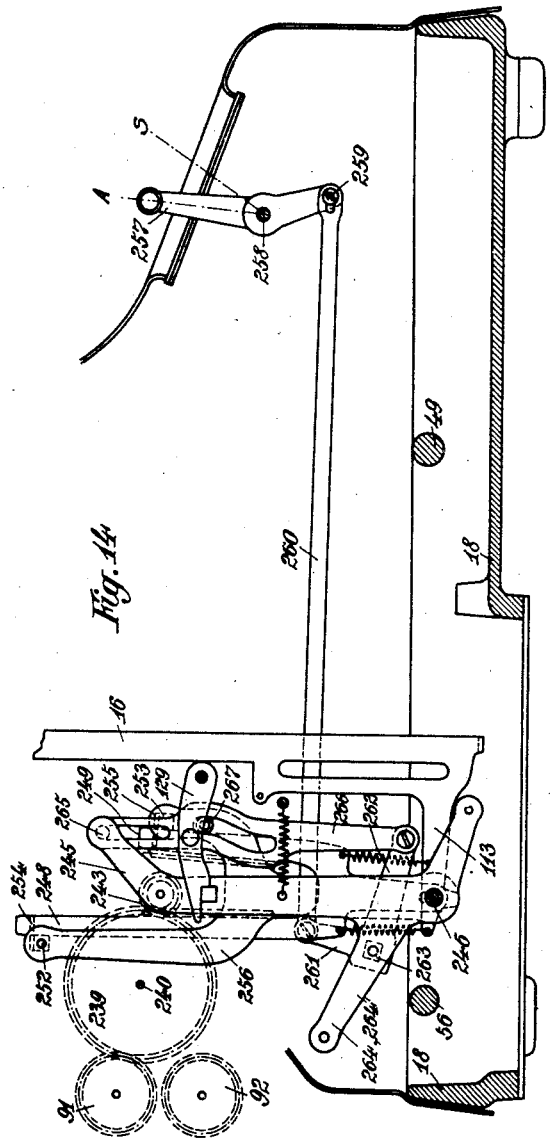

Figure 11 is a longitudinal section through the machine,

Figure 12 shows on an enlarged scale the driving members and the tens carrying device Figures 13 and 14 show the change-over and control device for the driving members.

Figure 15:
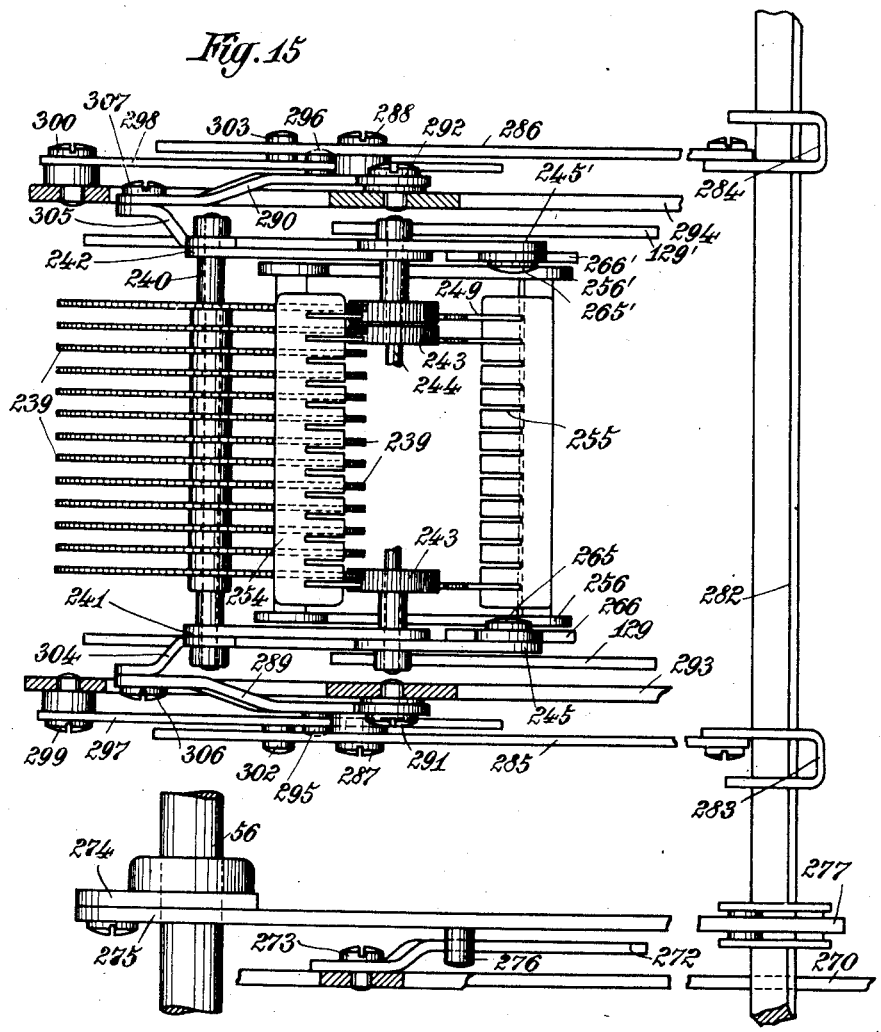

Figure 15 shows the arrangement of the driving members, looking from the top

Figure 16 is an example of the work

Figures 17 to 20 show the third construction, that is

Figures 17, 18:
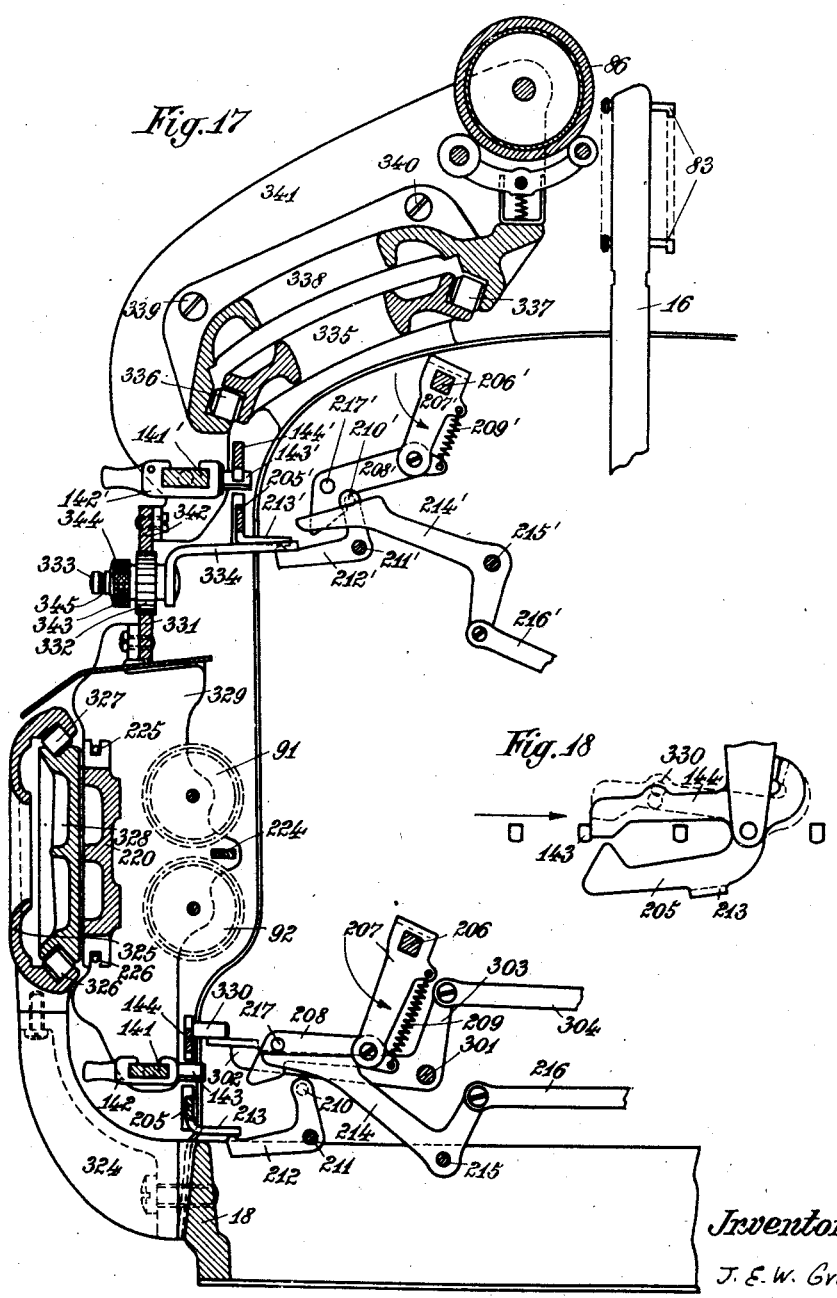

Figure 17 is a section through the two carriages

Figure 18 is a detail view

Figures 19 and 20 are two examples of the work.

The invention will be described in the following with reference to a ten key adding machine of the known "Astra" type, such as disclosed in Patent No. 1,707,303 issued April 2, 1929, in which the keys 0 to 9 are mounted in the front part of the machine on a fixed spindle 10 and held by springs 11 in the position shown in Figure 1. The lower ends of the keys are provided with push rods 12 which are guided in a small bracket 13 in one vertical line, and on the keys being depressed, move the setting parts 14 of a setting piece carriage 15, by which the upward movement of the type bars 16 is limited by means of their guide rods 17. The guide bracket 13 is secured to the bed plate 18 of the machine, and the guide 19, 20 for the rods 17 is also secured to it.

The guide device for the type bars 16 is constituted by fixed cross bars 21, 22 and 23 as well as guide combs 24 and 25. Springs 26 have the tendency to pull the type bars upwards, but a rod 27 keeps them in the position shown in the drawings, so that they can make their movement only when on the machine being operated the rod or bar 27 is moved into its upper position 27'. The type bars are provided with toothed racks 28, 29 for driving or operating the counting gears 30, 30' and 31, 31' which are the principal or main accumulators. The parts 32, 33, 34 and 35 belong to the tens feed devices of these counting gears.

The setting piece carriage 15 is mounted between rods or bars 36, 37 in a transversely adjustable manner on rollers 38, 39 and its lateral movement is controlled in the known manner by an escapement—not shown in the drawing,—on one of the figure keys being struck.

The accumulators 30, 30' and 31, 31' are sets of reversible wheels for addition and subtraction action, and are rotatably mounted on pivot pins 40, 41 supported by arms 42, 43 which in their turn are mounted on fixed spindles 44, 45 also so that they may be turned. In the position shown in Fig. 1 the accumulators 30—30' and 31—31' are set for additions because the upper wheels 30 and 31 are in mesh with their operating racks 28 and 29. When moving the accumulators around their pivots 40 and 41 so that the lower wheels 30' and 31' will be in mesh with the racks, the accumulators will be set for subtraction. This method of changing from addition to subtraction and vice versa is well known and therefore a further description is not thought necessary. Owing to the tension of the springs—not shown in the drawings—the counting gears 30 and 31 always have the tendency to become disengaged from the racks 28, 29 and are brought to the working position by means of pins 46, 47 of the arms 42, 43' with the assistance of a cam disc 48, Figure 2.

The control of the counting gears is effected during the running of the machine, by the main shaft 49 to which is keyed a notched or toothed disc 50 (Figure 4) which is hinged by means of a spring controlled connection 51, 52, 53 and 54 to a lever 55 which is rigidly secured to a spindle or shaft 56. The spindles 49 and 56 are mounted in the bed plate of the machine.

The spindle 56 carries a further lever 57 (Figure 2) with a pivoted double acting pawl 58 which, owing to the action of a spring 59, always has the tendency to occupy the central line of the lever 57. A part 61 pivoted to the lateral frame of the machine about a pin 60 is provided with two pins 62, 63 with which co-operates the pawl 58, owing to which the part 61 is turned forwards or backwards during the movement of the machine.

A lever 64 pivoted about the pin 66, also co-operates with the pins 62, 63 by means of an upper recess which in Figure 2 surrounds the pin 62 and of a bottom projection 65, and therefore on the machine being operated, the lever 64 takes part in the movement of the part 61 owing to which a lever arm 66 engaging with the lever 64, and the square spindle 67, are turned.

The square spindle 67 is mounted on its round ends between the lateral frames of the machine, and carries a further lever 68 which surrounds by its upper bifurcated end the pin 69 of a bell crank lever 70, so that on the spindle 67 being operated, the lever 70 is also turned about its fixed fulcrum 71.

A rod 72 is secured by means of a shoulder screw 73 to a lateral arm of a lever 74 which is secured to a square spindle 75 mounted on a turned-on pin between the lateral frames of the machine (Figures 2 and 3).

The slide 48 provided with cams 48' and 48", is guided by two slots on set screws 76, 77 in which are fastened in arm 74, and the lower part of the slide is formed into a fork with which engages a pin 78 of the bell crank lever 79. The latter is secured to a rotatably mounted square spindle 80 and connected with its lower arm by means of a rod 81 to a throwing-in gear lever 82.

In the position shown in Figure 2, the throwing-in gear lever 82 is in such a position that the slide 48 presses with its upper lateral cam 48' against the pin 46 of the arm 42 and thereby keeps the counting gear 30, 30' in the operative position. When the handle 82 is set to the next position marked 1' in Figure 2, this produces the lifting of slide 48, so that its lower cam 48" becomes operative and brings the counting gear 31, 31' into the operative position by means of the pin 47 of arm 43. A further movement of the hand lever 82 into the right hand end position marked 2, raises the rod 48 still more, so that the pin 46 slides off from the upper cam of the rod whilst the pin 47 still remains on the straight surface of the lower cam.

The counting gear 30, 30' has been thus disengaged, whilst the counting gear 31, 31' still remains in engagement. The return of the lever 82 to the zero position or position of rest, produces a pulling down of the slide 48 to a point in which the two pins 47 and 46 are out of reach of the lateral cams, so that both counting gears are brought out of the working position by spring action.

The working of the parts described is as follows:

The digits of the items are struck successively on the keys, and in that way the corresponding setting parts 14 in the setting piece carriage are moved forward. The machine is thereupon operated by a hand lever or by a power drive, owing to which the shafts 49 and 56 are given a movement in the direction of the arrow (Figure 4) so that the pawl 58 (Fig. 2) of the arm 57 presses with its upper notch against the pin 62 of the part 61, and turns the latter about its centre of rotation 60. The lever 64 which surrounds the pin 62 presses back therefore the lever arms 66 and 68 of the spindle 67, owing to which the spread toggle joint 70, 72, collapses under the pressure of the pins 46, 47. This pressure is exerted by the springs which engage with the counting gear frames 42 and 43 and always have the tendency to disengage the counting gears from their driving racks.

The arm 74 with the cam slides 48, 48' and 48" is therefore moved in the direction of the arrow, and the counting gear 30, 30' which was in working position, is thereby brought out of engagement with its driving racks.

The rod 27 (Figure 1) is now raised as example into the dotted position 27', and the type bars 16 therefore obey the pull of their springs 26 until they strike with their rods 17 against the advanced setting parts 14, owing to which the types 83 are placed correspondingly to the digits set by the keys.

The striking device 84 is now released, the hammers 85 of which are projected against the types set, and make an impression. The main spindles 49 and 56 have now completed their forward movement, and are brought back to the initial position by springs not shown in the drawings. During that time, the lower notch of the pawl 58 of the lever 57 seizes the pin 63 and forces the rotatable part 61 back to its position shown in Figure 2, owing to which the remaining parts are also brought to their position of rest by means of the rod 64 as well as of the levers 66, 68 and of the toggle joint. The toggle joint 70, 72 is thus stretched again, and the counting gear 30, 30' by means of its pin 46 is brought into engagement with its rack 28 by means of the upper cam 48' of the slide 48. The rod 27 is now again depressed, and it drives the raised type bars back again, owing to which the counting wheels which are now in engagement, are given a rotation corresponding to the number set. When printing the total it is necessary that the accumulator 30—30' remain in engagement with its driving racks during the forward stroke of the machine and is put out of engagement during the back stroke.

The control of the arm 74 takes place in the reverse manner as by operating a total key or lever the steering lever 64 is lowered, so that its upper fork releases the pin 62, and its bottom projection 65 comes to rest upon pin 63. On the machine being operated, the pawl 58 again turns the part 61 in the direction of the arrow, and the projection 65 drops behind the pin 63, so that during the return of the arm 57 to the position of rest and the turning of the part 61 into the position shown in Figure 2, the rod 64 bends the toggle joint 70 and 72 by means of the pin 63 and of the lever arms 66 and 68, so that the counting gear 30, 31 is disengaged from its driving racks by beginning of the return stroke of the machine.

In order to take a sub-total it is necessary that the counting gears 30—30' should be left in engagement during the forward and backward stroke of the machine. This is done by depressing a sub-totals key which causes the rod 64 to be held in a neutral position in which it is not affected by the pins 62 and 63. This working is generally known and is here briefly mentioned merely for the sake of greater clearness.

In order to enable column work to be done advantageously on the form, it is necessary that it should be possible to print in any desired way on the whole width of the sheet, without the number of counting gears becoming inadequate on that account. For that reason instead of providing single counting gears for the different headings or columns, according to this invention, a sufficiently large set of counting wheels is provided, single ones of which may be operated at will.

Figure 1:
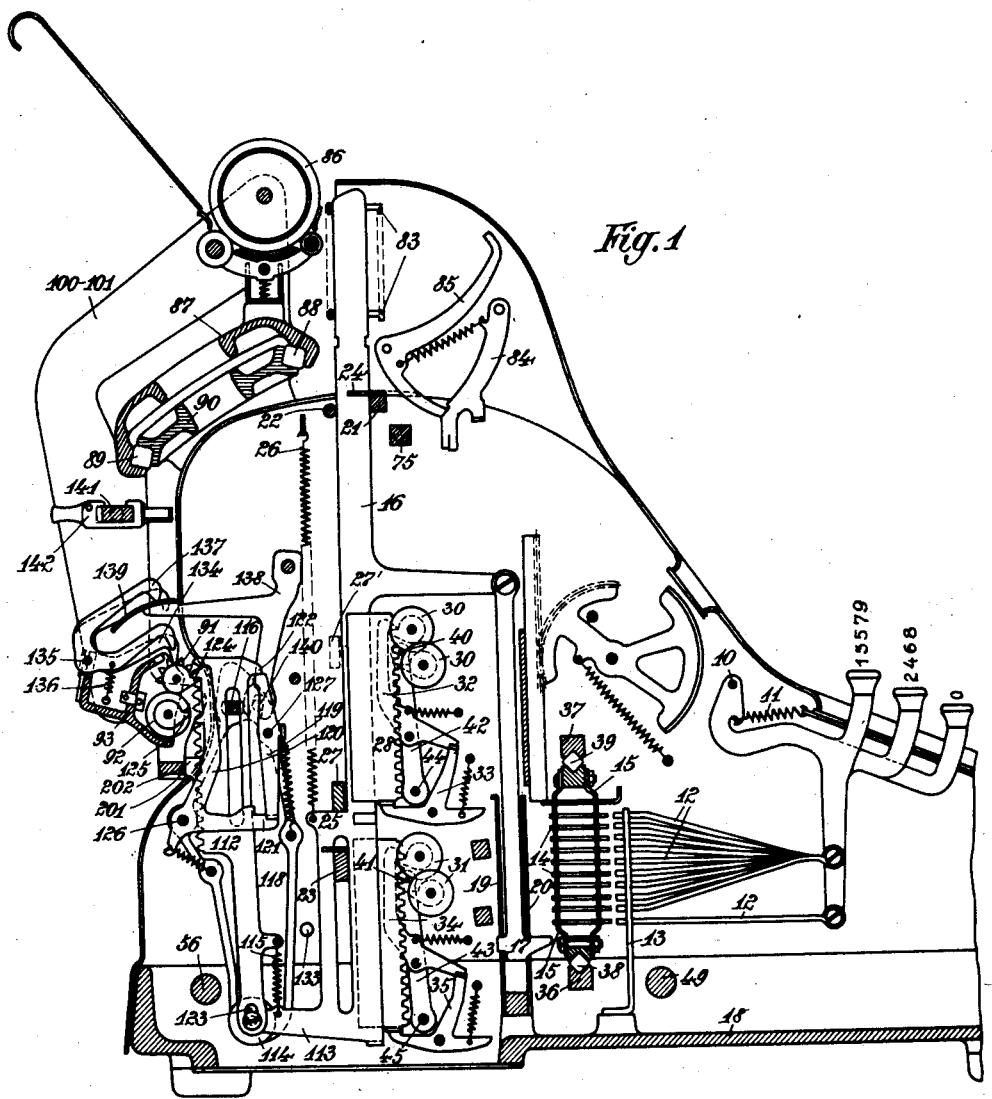
Figure 1 shows the general arrangement of the machine in longitudinal section.

The wheel set comprises counting wheels 91, 92 arranged in reversible pairs one wheel above the other, these wheels are mounted on thin spindles in a casing 93 (Figures 1, 7 and 8). The distance of the single wheel pairs from one another is, according to the invention, the same as the lateral distance apart of the type bars 16. In order to avoid any bending through of the thin spindles of the counting wheels, in the frame 93 are provided thin partition walls 94. In the present case they are at such a distance from one another that in each case ten counting wheels are situated between them. The frame 93 is made of precision casting, namely with notches or recesses for the guiding of projections 95, 96. The lower part of the wall 94 is held in a slot of a bolt 97, the turned stem or shank of which projects through a hole in the wall of the frame 93 and which is secured against falling out by a wire 96. The bolts 97 are secured to the partition walls by a pin or a rivet 99.

In that way, the walls 94 are afforded a firm hold in the frame 93 so that they not only form a stiffening of the thin spindles, but also represent a means for fixing the lateral distance and for reducing the lateral friction of the counting wheels. The number of the counting wheels is in some cases very large, according to the width of the forms for which the machine is built, and there may be 150 to 200 wheels arranged next to one another in a row. Small differences in the thickness of the single wheels would be already of importance for the total length, which is avoided by the walls 94. Without the latter, also in the oblique position of the machine, the lateral thrust, of the whole of the wheels would be taken up only by a single point and therefore would be too strong. This disadvantage is also avoided by the partitions 94.

The frame 93 is connected by means of lateral walls 100, 101 (Figure 1) to a frame 87 which has angle-shaped track surfaces 88, 89 which are adjustable on rollers of a rail 90. The frame 87 carries a platen 86, the length of which corresponds to the largest form.

In order to enable the upper or the lower counting wheel to be brought into the working position, owing to which an addition or a subtraction is performed, the frame 93 is mounted in the lateral walls 100, 101 so that it can turn about the point 102 (Figure 4). The changing-over or reversing is effected by means of the cam discs 105, 106 which are arranged at the point 107 at both sides of the carriage and have a downwardly projecting arm 104 which carries a crossbar 103 which thus extends throughout the whole width of the carriage. Above and below the centre of rotation 102 for the counting gear frame 93, are provided rollers 108, 109 in the lateral walls of the frame.

In the position shown in Figure 4, the upper cam 105 presses against the roller 108, owing to which the counting gear is held in the position for addition. The cross bar 103 is held by the bifurcated end of a rod 111, the other end of which is connected to a setting lever 110. When this lever is moved from the position marked "A" into that marked "S" the levers 104 will be turned, and therefore the lower cams 106 of these two lateral levers press against the rollers 109, whilst the upper cams 105 release the rollers 108 so that the counting wheels are brought into the opposite position which corresponds to subtraction. The changing over from addition to subtraction or conversely could be of course effected, instead of by hand, also automatically by the working of the machine.

For the driving of the counting wheels 91, 92 a set of toothed racks 112 (Fig. 1) is provided, which, according to the invention is connected to the type bars 16. It contains therefore as many racks as there are type bars in the machine, in the present case thirteen. The racks are hinged to rearward arms 113 of the type bars, and provided at the top with a slot in which is arranged a comb-like guide bar 116 which is secured between two small side frames 117, 118 (Figure 3). The two side frames are mounted so as to be rotatable at a fixed point on their hubs 114 and arranged so far apart that the set of driving elements 112 as well as the tens feed pawls 120 are situated between them. The lateral distance of the racks 112 is the same as that of the type bars.

On the counting wheel carriage 93 is provided a guide bar 201 which forms a support for the lateral frames 117, 118 so that an exact engagement is ensured.

In Figure 1, the driving elements 112 are shown in engagement with the counting wheels 91, and a control device is provided which, on the machine being operated and during the forward movement of the same, disengages the racks, whilst during the return movement of the machine the racks again come into engagement, and turn the counting wheels in accordance with the single digits of the number struck on the keys.

At the bottom end of the racks 112 is provided an elongated hole 123 through which they are guided by means of a set screw on the arm, and a spring 115 has the tendency always to pull down the rack. With the machine at rest as shown in Fig. 1 and in case a carrying of tens did not take place during the last operation of the machine, the racks 112 are held one tooth higher by means of their projections 122 striking against the upper arm of the total lever 119. The counting wheels 91 and 92 are provided with tens carrying cams 124, 125 by means of which the pawls 120 are turned, owing to which the device 121 locking the tens advance pawls to the locking pawls 119, is released, so that a further movement of the projection 122 to one division takes place. The tens advance pawls 120 as well as the locking pawls 119 are mounted on spindles 126, 127 between the small side frames 117, 118 and therefore take part in the turning movement of these frames during the process of engaging with, or being disengaged from, the racks 112.

The side frames 117, 118 rotatably mounted on their hubs 114 on fixed bolts, are always pulled by a spring 128 against a pawl 129 (Figures 2 and 3) which is rotatably mounted at the point 130 in the lever arm 74 and always held in the position shown in the drawings by a spring. It will be readily understood that on the counting gears 30, 30' and 31, 31' or on the steering elements for the same, being operated, the side frames 117, 118 participate in their movement, whether it be a normal calculating or total and sub-total operation. In other words, whenever levers 77 swing back and forth side frames 117 and 118 will be likewise moved. In the same way as in the case of single calculations, the counting gears 30, 31 are brought in and out of engagement with their driving racks 28, 29, the racks 112 also are brought in and out of engagement with the counting wheels 91 or 92.

When the work is to be done only with the counting gears 30, 30', 31, 31' or with one of the same, a spindle 150 is turned by throwing over a hand lever 203 (Figure 3) with the assistance of the rod 204 and lever 205, so that a lever arm 151 raises the pawl 129 until it releases the square pin 132 in the side frame 117 owing to which the two side frames are able to yield to the action of the spring 128 until they strike a fixed stop 133 in which position the racks 112 are out of engagement with their counting gears.

In the position shown in Figure 1, the driving elements 112 are in engagement with the counting wheels 91, and it is assumed that the column is situated in about the centre of the form. As already stated, there are thirteen driving elements 112 (Figure 9), and therefore only thirteen of the wheels 91 are in engagement with the racks, whilst the other wheels of the set, to the right and to the left of the working ones, are prevented from turning by pawls 134. These pawls are mounted on a spindle 135 of the counting wheel frame 93 and controlled by the action of springs 136 which have the tendency always to pull the pawls into the intervals between the teeth of the wheels 91. The pawls 134 of the counting wheels which happen to be in engagement with the driving elements 112, are held out of engagement with the counting wheels by means of their arms 137, so that the latter can be turned at given moments, namely by two bell crank levers 138 which are secured to a square spindle which is mounted on turned-on pins between the side frames of the machine. Between the horizontal arms of the bell crank levers is mounted a cross bar 139 which extends transversely over thirteen pawls. The lower arm of the bell crank levers 138 surrounds with its bifurcated end a pin 140 of the side frames 117, 118 so that on the elements 112 being thrown out of gear, the cross bar 139 will be lowered, and the raised pawls 134 lock the released counting wheels.

The counting wheel carriage can be operated by hand as well as automatically during the working of the machine, and for this purpose between the lateral walls 100, 101 of the carriage is provided a rotatably arranged cross bar 141 which carries adjustable riders or slides 142 which can be set to the single headings or columns of the form to be printed upon (Figures 1, 3, 4, 6 and 10). The cross bar 141 is provided with teeth, the pitch of which corresponds to the distance between the type bars or the counting wheels 90, 91 so that by setting the riders 142, the counting wheels are at once allotted to the single headings or columns of the form.

A particularly important advantage of the counting wheels 91 arranged side by side without an interval, is that the setting of the riders 142 for the single headings of the form 218, at once brings the required counting wheels into the operative position.

In Figure 9 the heading or column A is in the working position, its width is such that seven-figure numbers can be printed in it. Consequently, of the thirteen elements 112, only the seven on the left hand side become operative. The next column B is smaller, and only five-figure numbers can be printed in it, so that only the first five type bars reckoning from the left in Figure 9, can be used.

The capacity of the numbers which can be taken up in a single column, depends—apart from the width of the column on the form itself—on the number of places of the machine, which in this case amounts to thirteen.

The counting wheel carriage is always pulled by a spring to the left, seen from the front of the machine, or in the direction of the arrow in Figure 6, which is a rear view, and the riders 142 strike with their projections 143 against a stop lever 144 which is rotatably mounted at a fixed point of the machine and operated by the mechanism of the machine during the movement of the latter.

A lever 205 (Figures 9 and 10) mounted at the same point, is raised during the forward stroke of the machine and then strikes the lever 144 so that the latter releases the projection 143. On a rotatably mounted square spindle 206 (Figure 10) is mounted a lever 207 which, during the forward stroke of the machine, is turned in the direction of the arrow. Its pawl 208 which is controlled by the action of a spring 209, engages over the pin 210 of a bell crank lever 212 pivoted about a fixed point 211, owing to which the horizontal arm of the latter lever raises the turned-over lug 213 of the lever 205, and therefore the latter. Owing to spring action, the counting wheel carriage springs to the extent of one division in the direction of the arrow during the forward stroke of the machine, and the tabulating elements described are brought back to the position of rest during the return movement of the machine.

The toothed bar 141 is provided at one end with a handle 145 (Figures 3 and 4) by means of which it may be turned so that the stop 143 of the rider which happens to be in engagement with the pawl 144 is moved down out of the path of the pawl, so that the carriage can be moved by hand at will to any desired column. A spring 146 brings the lever 145 back to the position shown in the drawings, as soon as it is released, so that the projection 143 of the rider 142 situated in the column in question, strikes the locking lever 144.

In the position of rest of the machine, the racks 112 are in engagement with the counting wheels 91 or 92, and according to the invention, an arrangement is made by which, when the counting wheel carriage is moved by hand, these parts are first disengaged from one another. To that end, to each of the two outer ends of the bar 141 is secured a downwardly projecting arm 147 (Figures 3 and 4) which carries a bar 148 of suitable cross-section which extends over the whole length of the carriage. The lower rounded-off portion of this bar co-operates with a surface of a bell crank lever 149, 151, secured to a square spindle 150 which is rotatably supported in fixed bearings on its turned ends. The upward arm 151 of the said bell crank lever is provided with a cam surface which, on the arm 149 being depressed, raises the pawl 129 by means of its pin 152, so that this pawl releases the square bolt 132 of the side frames 117, 118, and the latter can obey the pull of the spring 128, so that the racks 112 as well as the tens carrying pawls 120 are moved out of reach of the counting wheels 91 and 92. The counting wheel carriage can therefore be moved to and fro at will by hand without coming in contact with the said parts.

When the handle 145 is released, the parts 147 and 151 are brought back again to the position shown in Figure 3 by the springs 146, 154.

Pawl 129 will then rest upon stud 132 and drops behind it by the pawl of its spring 131 as soon as lever 74 will be swung in the direction of the arrow, which takes place during the forward stroke of the next normal operation of the machine.

It is essential that in the position of rest of the machine, in which the driving racks 112 are in engagement with the counting wheels 91 or 92, the counting wheel carriage shall be locked against any accidental movement. To that end, according to the invention is provided a safety device which is constituted by a lever 155 (Figures 3-5) which, in the position of rest of the machine, surrounds by a notch the pin 143 of the rider 142 which happens to be in the working position, so that the carriage cannot be moved to either side. On the handle 145 being operated, the pin 143 is disengaged from this safety device, and the parts 112 and 91, 92 are brought out of engagement, as already described, so that it is possible to move the counting wheel carriage at will without any obstruction.

During the normal working with the machine, the springing forward of the carriage from column to column takes place automatically during the movement of the machine owing to the operation of the tabulating pawl 144. It is therefore necessary to cancel the locking 153 during this movement.

For that reason, the part 155 with two arms 156, 157 is secured to a square spindle 158 rotatably mounted on turned journals or pins, and a bifurcated lever 159 also mounted on the said spindle, surrounds a pin 160 of a double lever 162 which is pivoted at a point 161 and operated through its bifurcated lower end by a pin 163 which is riveted to the lateral wall 117.

In the machine according to the present invention, it is advisable to throw the driving racks 112 out of gear during the performance of a calculating operation, immediately on the beginning of the forward stroke of the machine. This is done by moving back the frames 117, 118, and it will be readily understood that in that way the double lever 162 is turned, and in its turn turns, by means of its pin 160, the spindle 158 in such a manner that the safety device 155 is raised so that it releases the pin 143. The pawl 144 is now also raised by the mechanism of the machine, so that this pawl is brought out of the path of the pin 143. This pawl however immediately descends again, and the next stop 143 of the carriage moving under the action of the spring pull, now meets it.

After the forward stroke of the machine, in this position of the carriage the printing of the number set in the machine takes place immediately at the beginning of the return stroke of the machine, and at the same time the frames 117, 118 are brought back again by the counting gear control device to the position shown, that is to say, the driving elements 112 are again brought into engagement with the counting wheels, so that the locking device 155 again becomes operative.

It may happen that during the forward stroke of the machine, at the time when the safety device 155 is released, the carriage is intentionally or accidentally prevented from springing forward, owing to which the number struck on the keys is not brought in the column provided for it. In order to avoid this, a further safety device is provided which stops the movement of the machine whenever the counting gear carriage is not in its correct position.

This safety device is constituted by a roof shaped part 164 (Figures 4 and 6) which is influenced by the ends of the pin 143. The part 164 is held by two arms 165, 166 which are secured to a rotatably mounted square spindle 167 on which is provided an arm 168 which co-operates with the raised head of a set screw 169, which is secured to one end of a double lever 170. The latter is rotatably mounted at a fixed point 171, and the set screw 169 is surrounded by an elongated hole of a second lever 172 which is also mounted in a rotatable manner or pivoted at the point 174 to a long lever arm 173. A spring 175 has the tendency always to keep the toggle joint constituted by the levers 170, 172 in the stretched position shown in Figure 4, one arm 176 of the lever 172 finding support on the bent lug 177 of the lever 170.

The long lever 173 is mounted loose on the driving shaft 56 and provided with a pin 178 against which strikes in the present case the stop face 179 of the lever arm 55 keyed to the shaft 56, so that the shaft is prevented thereby from making its complete movement and during the continued movement of the shaft 49, only the springs 53, 54 are stretched.

In adding and calculating machines locking devices are generally provided which become operative as soon as the spring connection between the two driving shafts is stretched. Such a locking device which cooperates with the notched disc 50, becomes operative in the present case, and in that way the backward stroke is stopped until the complete forward stroke is finished.

In Figure 4 the safety device 164 is shown in the operative position, that is to say, the counting wheel carriage is not in the column in which the number is to be printed. When the local obstacle for it can only be such, is eliminated, the carriage obeys the pull of its spring, and the stop 143 of the rider concerned at the time, forces the part 164, by means of its oblique surface, back to such an extent as to bring it into the position shown in Figure 6.

In that way the levers 165, 166 are turned, so that the longer lever arm 168 presses against the screw 169, and the toggle joint 170, 172 bends, so that the lever arm 173 is moved in the direction of the arrow, and its pin 178 releases the path for the lever 55. The machine then makes the forward stroke completely, and the figure struck is printed in a reliable manner at the correct point of the paper and is taken up by the right counting wheels.

In order to avoid lateral movement of the counting wheel carriage during the operative movement of the machine, by the operation of the handle 145, there is provided a locking device which is constituted by a pawl 180 which is mounted at a fixed point 181 and controlled at its downward arm 182 by a lever arm 183 which is keyed to the shaft 56. In the position of rest of the machine, shown in Figure 3, the arm 183 keeps the projection of the pawl 180 out of reach of the bar 148, and it will be readily understood that on the machine being operated, the arm 183 at once releases the pawl so that the latter, obeying the pull of its spring, engages with its projection behind the bar, and thereby locks the handle 145.

To ensure a perfect working of the machine according to the invention, it is further necessary to lock the machine drive as well as the keys as soon as the counting wheel carriage is in working position. To that end, there is provided a rod or bar 185 (Figure 4) which is guided by means of an elongated slot on a pin 186 in the side frame of the machine, whilst its other end projects through the casing 187 of the machine and is guided by it. Its bifurcated end 189 surrounds the suitably shaped ledge 148 owing to which, on the handle 145 being operated, the bar 185 is given a movement in the direction of the arrow so that its pin 188 releases a locking pawl 190 (Fig. 4) which is mounted in a fixed point 191 on the side frame of the machine and controlled by the action of a spring 192. The pawl engages thereupon with the teeth of the notched disc 50, owing to which the main spindle of the machine is locked, so that no crank movement can be made. In the case of a power drive of the machine, the bar 185 would influence the switch of the motor in such a manner that it could not be operated.

The bar 185 locks by the described movement simultaneously the total and sub-total keys, and to that end, at its front end is provided a slot 193 with which engages a pin 194 when the machine is in the position of rest. This pin is carried by a bell crank lever 195 which is rotatably mounted at a fixed point 196 and has a pin which extends under the total and sub-total keys 198, 199. When one of these keys is depressed, the lever arm 195 is thereby given a movement downwards, and the pin 194 slides freely into the slot 193 of the bar. When however the handle 145 is operated and the bar 185 pulled forward, not only the machine drive is locked by the pawl 190, but also, owing to the slot 193 moving out of the path of the pin 194, the arm 195 is locked, so that the keys 198, 199 is thus prevented from moving.

The other arm of the bell crank lever 195 is connected by a rod 216 (Figure 10) to a bell crank lever 214 rotatable about the fixed point 215. In the case of column work, it is an advantage to be able after drawing the sub-totals and totals, to prevent the tabulating of the counting wheel carriage. As soon as one of the keys 198 and 199 for totals and sub-totals is operated, the bell crank lever 195 is turned, and in that way the bell crank lever 214 is raised so that its outer end strikes a pin 217 and thereby moves the pawl 208 out of reach of the pin 210. It will be readily understood that, on the machine being operated, the pawl 205 will now remain inoperative, and that there will be therefore no further tabulating.

In the machine described, the single columns on the form must be made so wide as to enable them to take up any result formed, as otherwise the totals of the single vertical columns will run into one another, and false sums will result. In order to eliminate this disadvantage in the construction according to Figures 11–16, in the carriage are arranged two or more sets of counting wheels so that they may be brought at will into engagement with one set of driving elements. As all the counting wheel sets have an addition and subtraction action, which would be difficult to obtain by the arrangement of reversible gears in the counters, the reversing movement for the counting wheels is arranged in the drive.

In the counting wheel carriage, between its lateral walls 100, 101, in place of the casing 93 for the counting wheels 91, 92, is mounted a cross bar 220 which has guide brackets 221 in which are mounted the spindles of the counting wheel sets 91, 92. A bar 224 provided with slots, engages with slots of the brackets 221 and determines thereby the lateral distance between the same.

The cross bar 220 is provided at the top and at the bottom with an elongated slot for the reception of the spindles 225, 226 for the locking pawls 227, 228 of the counting wheels. These pawls rest in transverse slots of the cross bar and each two opposite pawls are connected together by a spring 229. A casing 232 also secured to the lateral walls 100, 101, carries two angle bars 233, 234, in which are provided guide slots for the locking pawls 227, 228. Under the casing 232, between the lateral walls of the carriage, is arranged an angle shaped guide bar 235 which runs between two rollers 236, 237 which are carried by a stationary bracket 238 of the machine.

In the present case, in order to obtain favourable dimensions, the counting wheels 91, 92 have each twenty teeth and are connected to tens carrying cams 230, 231. In order to obtain a perfect working mechanism in the present case, unlike in the construction according to Figures 1–10, the counting wheels are not arranged so that they can be changed-over, but receive the reversing movement for the subtraction from their driving elements.

The latter are constituted by a set of toothed wheels 239 which are carried by a spindle 240 between arms 241, 242 (see also Figure 15). The wheels 239 are driven by smaller wheels 243 which are carried by a spindle 244 which is arranged between rotatably mounted side frames 245, 245'. These two frames are rotatably mounted at a fixed point 246 so that by turning them, the wheels 239 can be brought into and out of engagement with the counting wheels. The arms 240 and 241 which bear the spindle 240 are loosely mounted between the frames 245—245, on the same rod 244' as the gears 243. The throwing of the wheels in and out of gear is effected here as in Figures 1–10, by the joint counting gear control or steering mechanism of the machine by means of the pawl 129 which influences the side frames 245, 245' by means of the pins 133.

A spring 247 engaging with the side frame 245 has the tendency always to keep the toothed wheels 239 out of engagement with the counting wheels. In the position shown in Figures 11 and 12, the wheels 239 are in engagement with the upper set of counting wheels 91, in which case the wheels 243 are driven by racks 248 which form with the opposite racks 249 a fork 250, the lower part of which is connected through an elongated hole and shoulder screws 251 (Fig. 11) to the lateral arms 113 of the type bars 16. The upper end of the racks are guided by cross bars 252, 253 and guide combs 254, 255 secured between two bifurcated levers 256 (Figs. 12 and 14) which again are rotatably mounted at the fixed point 246.

In the position shown in Figures 12 and 14, the racks 248 are in engagement with the wheels 243, and there is provided a handle 257 by means of which the racks 248, 249 may be brought at will into and out of the operative position. The handle 257 is rotatably mounted at the point 258, and its lower arm is connected by means of screw 259 and rod 260 to a lever 261 which is secured to a square spindle 263 which carries two levers 262, 262' and is mounted with its round ends between the lateral arms 264, 264' of the lever arms 245, 245'.

In the upper part of each of the levers 245, 245' is provided a guide pin 265, 265' for the elongated hole of two cam levers 266, 266' which are pivoted with their lower end to the levers 262, 262'. When the hand lever 257 is thrown over into the position marked "S" in Figure 14 the levers 261, 262, 262' are turned by means of the rod 260, and in that way the cam bars 266, 266' are raised, so that their curves turn the bifurcated levers 256, 256' by means of rollers 267 to such an extent that the racks 248 are brought out of engagement, and the racks 249 into engagement, with the toothed wheels 243. It will be clear at once that in that way the wheels 243, 239 are given an opposite rotation which produces on the wheels 91, 92 a subtraction instead of addition.

During the normal working of the machine as well as during the total and sub-total operations, the driving elements 239 are brought at given moments into and out of engagement with the corresponding counting wheels, owing to the counting gear control of the machine acting through the pawls 129 on the supporting frames 245, 245'. It is necessary that the rack guides 252—255 should take part in the turning movements of the supporting frames 245, 245' and to that end, according to the invention, the parts 261, 262, 266 for the reversing are mounted at the point 263 of the movable arms 264, 264'.

The second set of counting wheels 92 is required to do work, whereby the machine is set so that the columns marked A will be produced by one and the column marked B by the other set of counting wheels. It is advisable to make the arrangement in such a manner that the setting of the driving elements to operate one set of counting wheels or the other, takes place automatically during the movement of the machine.

In their construction illustrated the automatic setting is not shown however, but for the sake of simplicity only the setting by hand. Owing to the alternate use of the two counting wheel sets, the sums of the single columns may become so great that they will reach into the next column to the left. This prevents the totals from running one into the other. The sums of the columns A and B are preferably printed under each other, in the manner shown in the example in Figure 16.

For the setting of the driving elements a hand lever 268 (Figure 11) is provided, which is mounted at the point 269 and connected by a rod 270 to a bell crank lever 271, 272 which is rotatably supported at the point 273. In the position shown in Figure 11, the lever 268 has been turned into the position marked "2", and the parts for the reversing of the driving elements have been set thereby so that when the machine is operated, the wheels 239 are brought from their upper position into the position shown in Figure 13. On the machine being operated by hand or by a power drive as in Figures 1–10, the main shaft 49 is turned, and this movement is transmitted in the known manner to the secondary shaft 56 which carries an arm 274 on which is mounted a fork-shaped control body 275.

The bell crank lever 271, 272 rotatably mounted at the fixed point 273, has been turned downwards by setting of the handle 268, so that a pin 276 of the control body 275 has been released by the lever arm 272. The control body has been lowered thereby to such an extent that its upper projection 277 comes to rest on a pin 278 mounted on a double lever 279, 280. The latter is secured to a spindle 282 which is rotatably mounted with its round journals between the lateral walls of the machine and carries two further levers 283, 284 (Figures 11, 13 and 15), on the upper ends of which are rotatably mounted curved or cam bars 285, 286. The other ends of these cam bars are guided by elongated holes on screws 287, 288 which are secured to bell crank levers 289, 290 which are mounted on screws 291, 292 in the two frames 293, 294 (Figure 15). The bell crank levers 289, 290 are provided at the bottom with pins 295, 296 which engage at will with two notches of locking levers 297, 298 (Fig. 13) and lock the levers 289, 290 in their position for the time being. The locking levers 297, 298 are rotatably mounted in the frames of the machine on screws 299, 300 and are always held in the position shown by springs 301. Pins 302, 303 in an upward arm of the locking levers co-operate with the cam-shaped ends of the bars 285, 286.

The reversing of the driving wheels 239 takes place in the following manner: by throwing over the lever 268 from 1 to 2, the lever arm 272 is lowered, so that the extended end 277 of the control member 275 comes to rest on the pin 278. The machine is thereupon operated. The joint control mechanism of the counting gears at once brings the driving wheels 239 out of engagement with the counting wheels by means of the pawls 129, and the spindle 56 with the lever 274 is turned to such an extent that the control member 275 strikes with its upper projection 277 against the pin 278 of the double lever 279, 280, owing to which the latter and the spindle 282 with the levers 283 and 284 on the same, are also turned.

The cam bars 285, 286 move during that time first in their elongated holes and depress by means of the pins 302, 303 the locking levers 297, 298 (Fig. 13), whereupon the idle movement in the elongated holes is at an end, so that now the angle shaped levers 289, 290 which are mounted at the fixed points 291, 292 (Fig. 15) are turned, and their locking pins 295, 296 are received by the second notches of the locking levers. By means of the rods 304, 305 which are pivoted by means of screws 306, 307 to the horizontal arms of the angle shape levers 289, 290, the supporting arms 241, 242 of the toothed wheels 239 are pulled down with the latter, so that the described parts are now in the position shown in Figure 13. The throwing of the driving wheels 239 in and out of engagement with the lower counting wheels 92 is brought about by the counting gear control device by means of the pawls 129, the spindle 244 swinging about the centre of rotation 246 and the spindle 240 about the point 306, which ensures a favourable engagement and disengagement of the teeth.

The racks 248, 249 which are operated and connected to the type bars 16 with their lower end 250 through the longitudinal hole and screws 251, are always pulled downwards by springs 311, 312 (Figure 12) but prevented from following this movement by locking levers 313. The latter are arranged on a spindle 314 mounted rotatably at the point 246 between the frames 245, 245' and are held by the lower end 309 of the tens advancing pawls 308 which are also mounted between the rotatable frames at the point 310. It will be seen at once that in the present case on the driving wheels 239 being disengaged the tens advancing device is also moved out of the path of the counting wheels 91, 92 or of the tens advancing cams 230, 231.

By throwing over the hand lever 268 into the position marked 1 (Figure 11) the control part 275, 277 is raised at its pin 276 by means of the rod 270 and the levers 271, 272 to such an extent that its lowest notch 277' is brought into the path of the pin 281. When the machine is now operated, first the driving wheels 239 are again disengaged from the counting wheels 92 by means of the counting gear control device, and the spindle 282 is turned by the pressure of the notch 277' against the pin 281, owing to which all the parts are brought back again to the position shown in Figure 11. During that time, the cam bars 285, 286 at first move in their elongated hole, and the front ends of their curves or cams depress the pins 302, 303 of the locking levers 297, 298, whereupon the angle levers 289, 290 are turned at the stationary point 291 until the locking pins 295, 296 have been received by the opposite notch of the locking levers. As shown in Fig. 13, the work is taking place therefore in exactly opposite way to that described in the preceding.

The locking of the counting wheels 91, 92 (Fig. 11) which are not in mesh with the driving wheels 239, is effected by the locking pawls 227, 228, which owing to the action of the springs 229 always have the tendency to engage with the intervals between the teeth of their corresponding wheels.

In Figure 11 the driving wheels 239 are in engagement with the wheel set 91, and the corresponding pawls 227 are therefore raised by a cross bar 315. The machine is in the present case one with thirteen places, that is to say, it has thirteen type bars as well as thirteen driving wheels 239, the bar 315 is therefore made of such a length that it extends over thirteen places and therefore always operates thirteen of the pawls 227. The bar is held between two levers 316 which are rotatably mounted at a fixed point 317 of the machine, and a downward arm 318 is controlled by a pin 319 of the arm 241. In Figure 11, in which the toothed wheels 239 are in engagement with the counting wheels 91, the pin 319 forces the lower arm 318 of the lever 316 upwards, so that the bar 315 keeps the locking pawls 227 of the counting wheels out of engagement.

When during the operation of the machine, the toothed wheels 239 are disengaged from the counting wheels the pin 319 moves away from the part 318 owing to the turning of the arm 241 with the frame 245 so that the bar 315 can obey the pull of a spring 320, owing to which the disengaged locking pawls 227 are lowered and lock the corresponding counting wheels.

For the lower set of counting wheels 92 a similar bar 321 is provided, which is also held between two arms which are rotatably mounted at the point 322. An upward part 323 of the arms is in the path of the pin 319, and therefore the latter presses down the bar 321 as soon as the driving wheels 239 are brought into engagement with the lower set of counting wheels 92. The working of the bar 321 is exactly the same as that of the bar 315.

In order to perform operations of the kind shown in the example in Figure 16, the machine is set so that in the columns marked A, the upper set of counting wheels 91, and in the columns marked B, the set of lower counting wheels 92 becomes operative, the changing-over of the driving elements 239 from one set of counting wheels to the other being effected either by hand or automatically by the working of the machine. The sums of the horizontal rows as well as their sum total, are obtained by means of two separate total totalizers.

The advantage of this arrangement is the great economy of space on the forms, and the particularly simple setting of the machine for such operations in which it is no longer necessary to consider as hitherto how broad the single columns must be kept, in order to enable the totals obtained and the corresponding reference letters to be taken up without the sums running into one another and without the result of the calculation becoming difficult to understand.

The invention has been described in the present case with reference to a machine with a laterally movable counting wheel set, but it could be applied direct also to machines of other kinds.

As machines of the kind described are chiefly used for working on forms in columns, in which case according to the kind of work very wide forms may be required, the counting wheel carriage which at the same time carries the platen, is made very long, so that in the outermost position it unfavourably affects the steadiness of the machine by its relatively great weight. For that reason, in the construction according to Figures 17-20 in the case of particularly long counting wheel carriages, the platen has been placed on a separate carriage which is given a direction of advance opposite to that of the counting wheel carriage, owing to which the shifting of weight is automatically balanced.

At the rear edge of the base plate 18 (Fig. 17) of the machine is secured a bracket 324 which supports a track rail 325 which receives in its angle-shaped tracks a carriage bar 328 on rollers 326, 327. The cross bar 220, on which are mounted the counting wheel sets 91, 92 is secured to the bar 328 and carries at each end a lateral wall 329, between which walls is rotatably mounted the bar 141 for the riders 142. The end 143 of the riders co-operates with the pawl 144 as in the construction of Figures 1-10 which is controlled by the parts 205 to 217. The carriage 328 is always pulled by the spring action in the direction of the arrow in Figure 18 and on the machine being operated, springs from column to column in the manner already described.

The feed device for the counting wheel set 91, 92 has been modified in as far as the pawl 144 may be disengaged by means of a pin 330 by a bell crank lever 302, 303 mounted in a fixed point 301, the said lever being connected by a rod 304 to a key or handle not shown in the drawings.

In the position shown in Figure 17, the pawl 144 is in the disengaged position and is raised into the position shown in dotted lines in Figure 18. The carriage 328 could be freely moved by hand to and fro, but there is a connection between it and the platen carriage, so that on the machine being operated, the carriage 328 is controlled by the platen carriage. To the two lateral walls 329 is secured a rack 331 which extends throughout the whole length of the counting wheel carriage and meshes with a toothed wheel 332 which is adjustably mounted on a staybolt 333. This staybolt is held by an angle 334 which is secured to the side frames of the machine.

The platen carriage is built in the same way as the counting wheel carriage and has a guide bar 335 which has angle shaped tracks for the reception of the rollers 336, 337, which support the carriage rail 338. This rail or bar has at each end a flange, and to these flanges are secured the lateral walls of the carriage 341 by means of screws 339, 340. Between the side walls is also mounted rotatably a toothed rack 141' which carries rider 142' which by means of their projections 143' co-operate with a feed pawl 144'. This pawl, like the pawl 144, is for the tabulating of the counting wheel carriage and is also controlled by a similar system of levers which for the sake of simplicity is marked here with the same reference figures with an index. Between the side walls 341 is secured a second rack 342 which also meshes with the toothed wheel 332.

In the disengaged position of the feed lever 144, the spring of the carriage 328 is put out of action in any desired manner, and it will be readily understood that by means of the two racks and of the gear 332, the counting wheel sets 91, 92 are also laterally moved in the direction opposite to that of the platen carriage. When therefore the platen carriage is moved to the left, the counting wheel sets will be moved to the right, and conversely. As the weight of both carriages is approximately the same, a balancing of the weights automatically takes place when the carriages are moved. It will never happen therefore that in the case of ordinary work both carriages will be pulled out to one side, owing to which the steadiness of the machine would be unfavorably affected.

The toothed wheel 332 is mounted according to the invention on the bolt 333 in order to enable it to be brought in and out of engagement with the racks 331, 342, and has a button or knob 343 as a handle for throwing it in and out of gear. The bore of the toothed wheel is recessed at one point for the reception of a spring ring 344 which in the two end positions of the wheel springs into grooves of the stay bolt 333.

When the wheel is pulled out by means of its knob 343 so that the spring ring moves into the groove 345, the racks 331, 342 are released, and the platen carriage as well as the counting wheel carriage therefore move independently of each other. This is particularly advantageous for performing operations in which single amounts of different kinds are to be printed in a vertical column and where it is of importance to produce automatically the printing of the single sums of different kinds as well as the total sum of the same, as soon as the calculation is finished, as is the case in the example of a calculation of wages shown in Figures 19 and 20.

The process of working for this purpose is as follows: The platen carriage and the counting wheel carriage are uncoupled and by a separate handle the pawl 217' is lifted out of its operative position so that the platen carriage which is set approximately in the centre of the machine, is not advanced on the latter being operated. The tabulating device for the counting wheel carriage is brought into engagement owing to the handle provided for the purpose being so set that the pawl 217 engages over the pin 210. The traction spring of the carriage 328—not shown here—is also hooked on, so that on the machine being operated this carriage will be automatically advanced. The carriage 328 is brought to its right hand end position, and the account form which must be obtained already printed in rolls, are fixed in the platen carriage and carried round the platen. In the counting wheel carriage are placed as many column stops 142, 143 as there are different items in the account form, and the distance between these stops is made to suit the width of the sums formed for the single items.

First of all the "wage 52, 80", Figure 19, is set in the machine and printed. This item is taken up in the first column of the counting wheels 91, as well as at the same time in one of the total counting gears of the machine. As no item is entered in the second line, a blank stroke is made, owing to which the paper is advanced to the extent of one line, and at the same time the counting wheel carriage 328 springs further to the left to the extent of one column. The second item "4.40" is thereupon put in, and therefore, on the machine being operated, is printed in the third line, the said amount being also taken up into the third column of the counting wheels 91, and at the same time into the total counting gear of the machine.

The working is continued in that way, and the total wage amount "61.70" is thereby formed which is printed as a sub-total. The other items "2.45", "4.24" and so on, are now set in the machine in the same way as described, and taken up in the corresponding counting wheels 91 as items of addition, but as it is a question of deductions, the first counting gear has been set to subtraction, so that the amounts in question are subtracted from the same. In this total counting gear is then formed the sum "26.00"; the said sum is printed at the end of the column. The single amounts of these deductions have been retained at the same time in a second total counting gear as items of addition and form here the sum "35.70" which is also printed from the said counting gear.

Similar methods of calculation are generally used in machines with several counting gears, but the great advantage of the new machine is that the single items which are of different kinds, are retained by the counting wheel set 91 and printed in vertical columns in accordance with their kind.

Consequently any desired number of such wage calculations may be carried out successively, and the items of similar kind always come into the counting wheels of the set 91, provided for the purpose so that when the whole calculation is finished, the single sums of the amounts of different kinds may also be printed. To that end, the counting wheel carriage 328 is again brought to its right hand end position, and the amount "61518.40" (Figure 20) is put down on paper from its first section by taking the total. The other amounts follow then successively in exactly the same manner as the amounts had been previously added.

The stored sums may be of course also printed transversely on a wide sheet when this is desired for book-keeping purposes.

Having now particularly described and ascertained the nature of my said invention and in what manner the same is to be performed, I declare that what I claim is:—

1. An adding and calculating machine comprising a set of counting wheels, a carriage for the said wheels, a handle to move the carriage transversely of the machine, a lock for the carriage adapted to be released by the operation of the said handle, a set of driving elements for the counting wheels and means to bring each counting wheel at will into and out of engagement with the driving elements when the lock is released.

2. An adding and calculating machine comprising a set of counting wheels, a carriage for said wheels movable transversely of the machine, a lock for said carriage, a set of driving elements for the counting wheels and means to bring each counting wheel at will into and out of engagemnt with the driving elements and means to release said lock during the movement of the machine as soon as the counting wheels are out of engagement with the driving elements.

3. An adding and calculating machine comprising a set of counting wheels, a carriage for the said wheels, a handle to move the carriage transversely of the machine, a lock preventing a transverse movement of the counting wheel carriage by hand by means of the handle during the operation of the machine, a set of driving elements for the counting wheels and means to bring the single counting wheels at will into and out of engagement with the driving elements.

4. An adding and calculating machine comprising a set of counting wheels, a carriage for said wheels, a set of driving elements for the counting wheels, means to shift said wheels transversely of the machine to bring each counting wheel at will into and out of engagement with the driving elements and a lock preventing the movement of the counting wheel carriage when the counting wheels are not in their exact working position.

In testimony whereof I affix my signature.

JOHN EMIL WILLIAM GREVE.